(12) United States Patent
McDonald et al.

(10) Patent No.: US 7,971,604 B2
(45) Date of Patent: Jul. 5, 2011

(54) FLOW CONTROLLER DELIVERY OF A SPECIFIED-QUANTITY OF A FLUID

(75) Inventors: R. Michael McDonald, Fort Collins, CO (US); Alexei V. Smirnov, Fort Collins, CO (US); Brian Lee, Fort Collins, CO (US); Michael John Zolock, Berthoud, CO (US)

(73) Assignee: Hitachi Metals, Ltd., Tokyo (JP)

( * ) Notice: Subject to any disclaimer, the term of this patent is extended or adjusted under 35 U.S.C. 154(b) by 931 days.

(21) Appl. No.: 11/407,837

(22) Filed: Apr. 20, 2006

(65) Prior Publication Data

US 2007/0246102 A1   Oct. 25, 2007

(51) Int. Cl.
    *B67D 7/30* (2010.01)
(52) U.S. Cl. .................. 137/487.5; 137/486; 222/14
(58) Field of Classification Search .............. 137/2, 486, 137/487.5; 222/14
    See application file for complete search history.

(56) References Cited

U.S. PATENT DOCUMENTS

| | | | |
|---|---|---|---|
| 4,360,127 A | | 11/1982 | Maruyama et al. |
| 4,394,871 A | * | 7/1983 | Czajka et al. ............ 137/115.25 |
| 5,062,446 A | | 11/1991 | Anderson |
| 5,410,495 A | | 4/1995 | Ramamurthi |
| 5,431,302 A | * | 7/1995 | Tulley et al. ..................... 222/14 |
| 5,684,245 A | | 11/1997 | Hinkle |
| 5,865,205 A | | 2/1999 | Wilmer |
| 5,944,048 A | | 8/1999 | Bump et al. |
| 5,967,367 A | * | 10/1999 | Orsborn ........................ 222/30 |
| 5,970,430 A | * | 10/1999 | Burns et al. .................... 702/122 |
| 5,971,042 A | * | 10/1999 | Hartsell, Jr. ................... 141/198 |
| 5,995,909 A | | 11/1999 | Bretmersky et al. |
| 6,202,680 B1 | * | 3/2001 | Irokawa et al. ............ 137/487.5 |
| 6,216,726 B1 | | 4/2001 | Brown et al. |
| 6,354,341 B1 | * | 3/2002 | Saveliev et al. ................. 141/94 |
| 6,363,958 B1 | | 4/2002 | Ollivier |
| 6,640,822 B2 | | 11/2003 | Tinsley et al. |
| 6,782,906 B2 | | 8/2004 | Chang |
| 6,853,920 B2 | | 2/2005 | Hsiung et al. |
| 2003/0183279 A1 | | 10/2003 | Chang |
| 2004/0187927 A1 | | 9/2004 | Kang et al. |
| 2005/0288873 A1 | | 12/2005 | Urdaneta et al. |

FOREIGN PATENT DOCUMENTS

WO   WO 92/12474       7/1992
WO   WO 03/032101 A1   4/2003

OTHER PUBLICATIONS

Lee W.Young, "PCT International Search Report—Date of Mailing Sep. 22, 2008".

\* cited by examiner

*Primary Examiner* — Stephen M Hepperle
*Assistant Examiner* — William McCalister
(74) *Attorney, Agent, or Firm* — Neugeboren O'Dowd; Sean R. O'Dowd

(57) ABSTRACT

A system and method for delivering a specified-quantity of a fluid using a flow controller based on a fluid delivery profile is described. One embodiment includes a fluid delivery profile that includes a delivery time window with a plurality of set points that each correspond with a specified instant in time within the delivery time window. The method also includes delivering the fluid according to the fluid delivery profile through a variable valve using the flow controller and a feedback signal from a flow sensor.

10 Claims, 8 Drawing Sheets

US 7,971,604 B2

FLOW CONTROLLER DELIVERY OF A SPECIFIED-QUANTITY OF A FLUID

FIELD OF INVENTION

The present invention relates to control systems, and in particular, but not by way of limitation, the present invention relates to systems and methods for controlling flow of a fluid.

BACKGROUND

Flow controllers are typically configured to deliver a fluid based on set points that are in terms of fluid flow (e.g., cubic centimeters per minute or grams per minute). When a set point is received, a flow controller adjusts, for example, a valve to deliver the fluid at the specified fluid flow set point in a steady-state mode. The flow controller generally adjusts the position of the valve to control the flow of the fluid around the set point using a control algorithm that is based on, for example, proportion-integral-derivative (PID) control.

Known flow controllers can be programmed to deliver fluid by receiving, for example, a pulse width and a set point much like a fuel injector. But, unexpected deviations in fluid flow away from the set point as a consequence of, for example, pressure changes can result in a significant deviation in the final amount of fluid delivered relative to the set point. Present flow controllers do not have the ability, based on feedback control, to change/adjust set points and/or delivery times (e.g., delivery time window) to accurately deliver a specified-quantity of a fluid. Additionally, known flow controllers can correct for deviations away from a steady-state fluid flow set point, but are not configured to correct for deviations away from a quantity set point.

Present flow controllers are functional, but are not sufficiently accurate or otherwise satisfactory if used to deliver a specified-quantity of a fluid. Accordingly, there is a need for a method and apparatus for receiving and delivering, based on feedback control, a specified-quantity of a fluid in response to receiving a quantity set point.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In some embodiments, the present invention may be characterized as a system and method for delivering a specified-quantity of a fluid in accordance with a fluid delivery profile. The fluid delivery profile in these embodiments includes a delivery time window with a plurality of set points that each correspond with a specified instant in time within the delivery time window. In variations, a feedback signal from a flow sensor is utilized in connection with the delivery of the fluid.

In another embodiment, the invention may be characterized as method for fluid delivery that includes changing a position of a variable-position-valve of a flow controller from a closed position to a first position to initiate delivery of a fluid in response to receiving a quantity-indicator, which indicates a specified-quantity of the fluid and adjusting the position of the variable-position-valve from the first position until the specified-quantity of the fluid is delivered. In this embodiment, the adjusting is based on a flow indicator, which is indicative of a flow of the fluid, and a fluid-delivery-profile.

In yet another embodiment, the invention may be characterized as an apparatus, which includes a memory configured to store a fluid-delivery-profile. In addition, the apparatus in this embodiment includes a processor, which is configured to access the fluid-delivery-profile and to control a variable valve in accordance with the fluid-delivery-profile so as to deliver a specified-quantity of the fluid.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

In accordance with several embodiments of the present invention, a specified-quantity of a fluid is delivered by a flow controller in response to a request for the specific quantity of the fluid. In many embodiments for example, a flow controller receives an indicator of the specified-quantity as a set point, which indicates a total number of moles or a total mass of the fluid, and using a feedback signal, the flow controller controls fluid flow according to a fluid delivery profile to adjust a variable valve until the specified-quantity of the fluid is delivered. The feedback signal in one embodiment, for example, is a measurement from a flow sensor, but as discussed further herein, other feedback indicators are utilized in other implementations.

In some variations, the flow controller also uses the feedback signal to monitor the delivered-quantity of the fluid in order to adjust, if necessary, the fluid delivery profile to ensure delivery of the specified-quantity of the fluid. In many implementations, the fluid delivery profile is a set of indicators that are used to deliver a certain amount of fluid during a period of time. In some embodiments, for example, a fluid delivery profile is a set of valve indicators with corresponding times. The fluid delivery profile in some implementations is derived mathematically, and in variations, the profile is configured based on constraints such as a minimum delivery window or a characteristic of a valve.

Advantageously, several exemplary embodiments allow a fluid to be delivered in response to a request for a specified-quantity of the fluid. In the context of a semi-conductor fabrication environment, for example, it has been found that delivering specified-quantities of reactants is especially beneficial because the recipes associated with the fabrication are often defined in terms of mass (e.g., mole) quantities.

Figure 1:
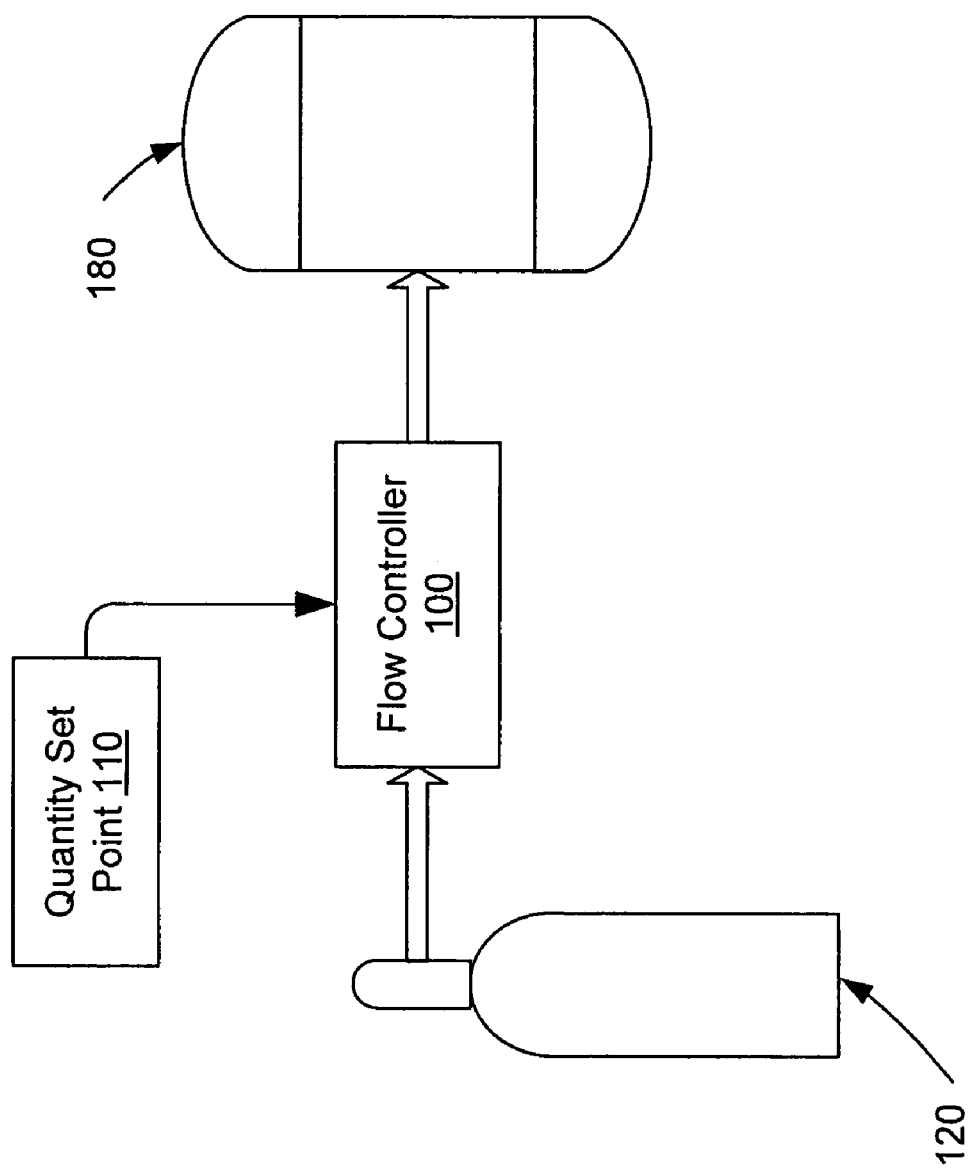
FIG. 1 is a schematic diagram of a flow controller that is configured to deliver a specified-quantity of a fluid, according to an embodiment of the invention.

Referring now to the drawings, where like or similar elements are designated with identical reference numerals throughout the several views, and referring in particular to FIG. 1, it illustrates an exemplary environment in which a flow controller 100 is configured to deliver a specified-quantity of a fluid from a fluid container 120 to a reaction vessel 180. Rather than receive a set point indicator in terms of, for example, a flow rate, the flow controller 100 in this embodiment is configured to receive a quantity set point 110 (e.g., total mass set point or total mole set point) that is an indicator of the specified-quantity of the fluid to be delivered to the reaction vessel 180. The quantity set point 110 is based on, for example, the total number of moles of the fluid needed for a reaction in the reaction vessel 180.

In operation, the flow controller 100 in the present embodiment delivers the fluid from the fluid container 120 to the reaction vessel 180 according to a fluid delivery profile in response to receiving the quantity set point 110. The quantity set point 110 is received from a user via, for example, a control server. In other embodiments, the quantity set point 110 is a pre-programmed value stored locally in the flow controller 110 that is accessed when needed.

As the fluid flows, the flow controller 100 in this embodiment also monitors the total number of moles of fluid delivered with reference to the fluid delivery profile and the quantity set point 110, and in addition, the flow controller 100 makes adjustments to the flow and/or the fluid delivery profile based on the monitoring until the specified-quantity of fluid indicated by the quantity set point 110 has been delivered. In several embodiments, the fluid container 120 and flow controller 100 are arranged such that the fluid container 120 delivers a continuous upstream pressure to the flow controller 100.

In some embodiments, the fluid is a liquid (e.g., sulfuric acid) and in other embodiments a gas (e.g., nitrogen), but a person skilled in the art will appreciate, having the benefit of this disclosure, that the fluid being delivered by the flow controller 100 may be any kind of fluid including, for example, a mixture of elements and/or compounds in any phase, such as a gas or a liquid. The flow controller 100 in many embodiments is configured to deliver a fluid under high pressure, low temperature, and to different types of containers or vessels.

Figure 2:
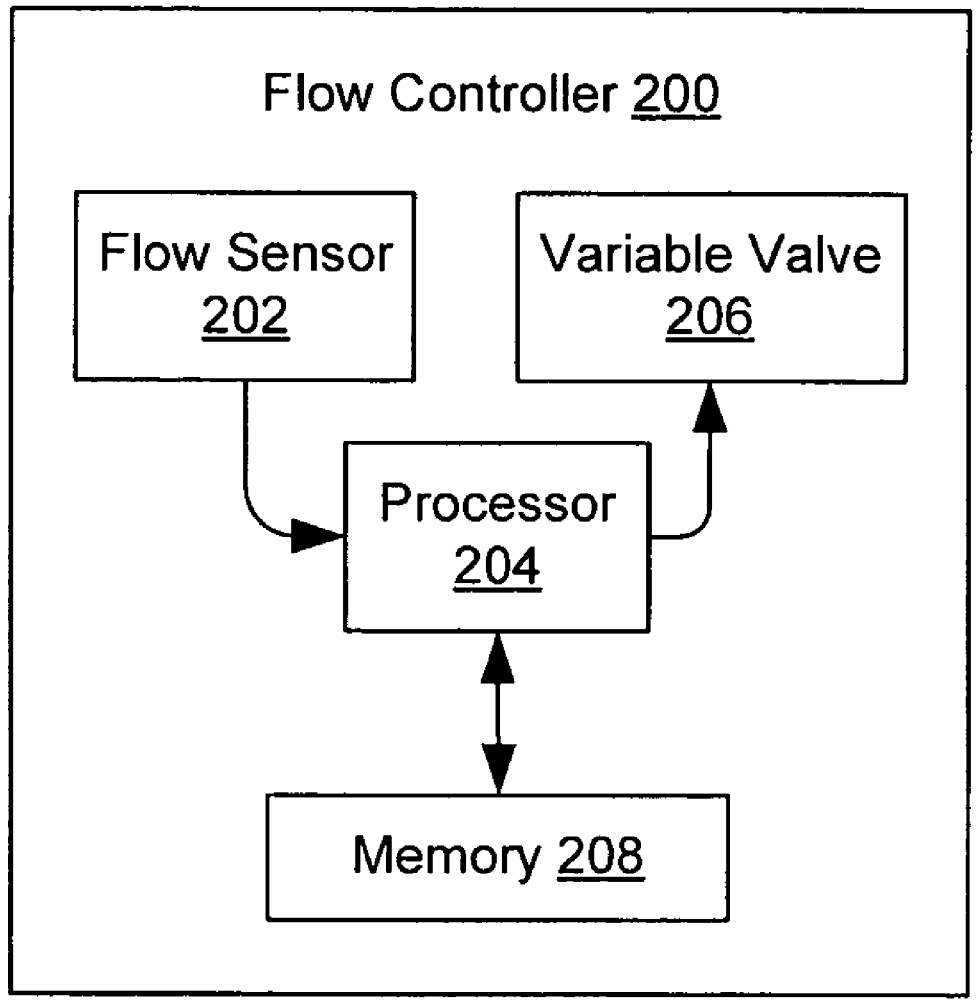
FIG. 2 is a schematic diagram of the components of a flow controller that is configured to deliver a specified-quantity of a fluid, according to an embodiment of the invention.

Referring next to FIG. 2, shown is one embodiment of the flow controller 100 described with reference to FIG. 1. Specifically, the flow controller 200 depicted in FIG. 2 includes a flow sensor 202, a processor 204, a variable valve 206, and a memory 208. The flow sensor 202 in many embodiments is realized by a thermal flow sensor, but in other embodiments a laminar flow sensor, coriolis flow sensor, ultrasonic flow sensor or differential pressure sensor are utilized. In variations, the flow sensor 102 is used in combination with any combination of other sensors to accurately measure the flow (e.g., temperature sensors and/or pressure transducers). In some embodiments, the flow sensor 102 is replaced with a sensor other than a flow sensor and one or more values from the sensor are used by the flow controller 200 to calculate the delivered-quantity of the fluid at a given time.

The variable valve 106 in this embodiment is any appropriate type of variable valve that changes the flow of the fluid in any way. For example, the variable valve 106 is a valve with a variable orifice or a valve with multiple pre-set positions. In several embodiments, the variable valve 106, when open and/or closed, receives a continuous upstream pressure from the fluid being delivered.

The memory 208 in several embodiments is used to store raw measurement values and corresponding measurement times. In other embodiments, in addition to (or in place of) the raw measurement values and corresponding measurement times, the memory 208 stores a running total of the fluid that has been delivered by the flow controller 200. In one embodiment, for example, the processor 204 calculates a delivered-quantity of a fluid at a given time and stores the value in the memory 208. At a second and later time, the processor 204 calculates an updated delivered-quantity of the fluid, and the value of the delivered-quantity is replaced with the value of the updated delivered-quantity. As discussed further herein, the running total in these embodiments is used with reference to the quantity set point 110 to determine whether an adjustment should be made to the position of the variable valve 106.

In operation, the exemplary flow controller 200 uses a feedback loop to deliver a specified-quantity of fluid indicated by a quantity set point according to a fluid delivery profile. Some exemplary feedback loops are described further herein with reference to FIGS. 4 and 7. The fluid delivery profile in the present embodiment is stored in the memory 208, but this is certainly not required and in other embodiments one or more fluid delivery profiles are stored external to the controller and retrieved when necessary.

In several embodiments, the fluid delivery profile is adaptable based upon one or more factors. In many embodiments, for example, the values of the set of indicators (e.g., valve setting indicators) and corresponding times in a fluid delivery profile (which is also referred to herein as the shape of the fluid delivery profile) are varied based upon one or more factors including, for example, a desired level of accuracy, a desired time window for fluid delivery, a flow rate and, as described further herein, one or more other constraints.

As an example, the shape of the fluid delivery profile in many embodiments is configured to alter, in accordance with one or more factors, the manner in which the variable valve 206 is opened and closed over the fluid delivery window. In many implementations, the profile delivery is designed to deliver a fluid in a short amount of time (e.g., 500 ms), but in some implementations the fluid delivery profile is designed based not only upon the time period and/or flow rate at which the fluid is delivered, but also upon one or more other constraints.

As an example, the fluid delivery profile, in some embodiments, includes indicators which are established so that the variable valve 206 opens gradually to prevent sensor(s) (e.g. the flow sensor 202) from reaching a saturation point. In other embodiments, however, the fluid delivery profile is configured so that the variable valve 206 delivers a fluid at a rate that saturates one or more sensors.

In some embodiments, the fluid delivery profile is based on a combination of mathematical equations including, for example, linear equations, logarithmic functions, hyperbolic equations, step functions, transient functions, and differential equations, and in several implementations, the fluid delivery profile is configured specifically for delivery of a particular type of fluid.

In accordance with many embodiments, while fluid is being delivered, measurements from the flow sensor 102 are used by the processor 204 to adjust the position of the variable valve 206 according to the fluid delivery profile. In this way, when flow measurements from the flow sensor 102 indicate that the flow is deviating from the fluid delivery profile, adjustments are made to the position of the variable valve 106 to conform to the fluid delivery profile. In some embodiments, the flow controller 100 utilizes a proportional-integral-derivative (PID) control algorithm but in other embodiments other control algorithms are applied.

In many implementations, the fluid delivery profile is adjusted while the variable valve 206 is delivering the fluid. In one embodiment, for example, measurements from the flow sensor 202 are used by the processor 204 to alter the fluid delivery profile. As an example, if the processor 104 determines (e.g., using measurements from the flow sensor 202), that the fluid delivery profile will not deliver, in its existing state, the specified-quantity of the fluid, the fluid delivery profile is adjusted so that the specified-quantity is delivered.

The flow controller 200 in the exemplary embodiment calculates the delivered-quantity of the fluid based on measurements from the flow sensor 202 and their corresponding measurement times. The delivered-quantity of the fluid (also referred to herein as the current delivered-quantity of the fluid) is the amount of fluid that has been delivered by the flow controller 100 using the most recent measurements. The measurements and corresponding measurement times used to calculated the delivered-quantity are stored in the memory 208 in this embodiment. In other embodiments, the measurements and corresponding measurement times are stored in a central server (not shown) and accessed by the processor 204.

The delivered-quantity of the fluid in the exemplary embodiment is calculated using an appropriate fluid equation and/or mathematical technique. For example, flow measurements in liters per second and corresponding measurement times in milliseconds are, for example, integrated using a finite element analysis to calculate the total number of moles at any given measurement time. Adjustments are made to the flow measurements using, for example, any combination of the flow sensor 202 and/or processor 204 using any technique to obtain an accurate flow measurement such as non-ideal fluid equations, empirical equations, and/or coefficients related to, for example, the flow controller, valve, pressure, and/or temperatures. In variations, adjustments are also made to other measured or calculated values to compensate for, for example, delays produced by processing time or physical limitations of components.

Although FIG. 2 shows that the flow sensor 202, processor 204, variable valve 206, and memory 208 are integrated into the flow controller 200 in a single device, in some embodiments, the components are combined or separated into different components and/or devices. For example, the memory 208 in one embodiment is embedded into the processor 204 as, for example, a small cache, or in an alternative embodiment is integrated into a separate centralized server (not shown) that stores data for the flow controller 200 or for several distributed and/or cascaded flow controllers. Similarly, in other embodiments the variable valve 206 is a separate component from the flow controller 200 that is either upstream or downstream from, for example, the flow sensor 202 and/or flow controller 200. Likewise, the flow sensor 202 in an alternative embodiment is a separate component from the flow controller 200 that is either upstream or downstream from any of the other components associated with the flow controller 200.

Although the set point, measurements, and calculations are expressed in terms of moles with reference to any many embodiments described herein, in other embodiments, these values are expressed in other units, such as grams, or expressed in combinations of units. In several embodiments, the measurements are converted into the proper or specific units using the processor 204 and/or a processor associated with the components in the flow controller 200.

Figure 3A:
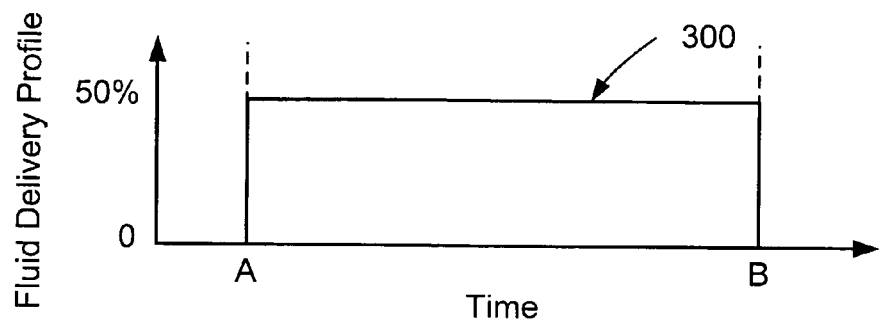
FIG. 3A is a graph of a fluid delivery profile for delivery of a specified-quantity of a fluid, according to an embodiment of the invention.
Figure 3B:
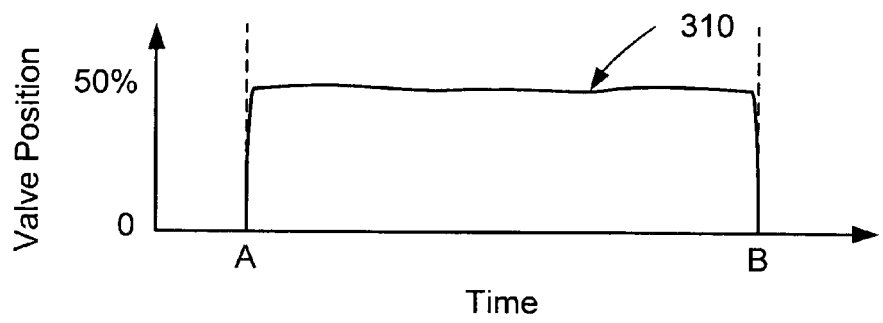
FIG. 3B is a graph of a valve displacement versus time during the delivery of a specified-quantity of a fluid, according to an embodiment of the invention.
Figure 3C:
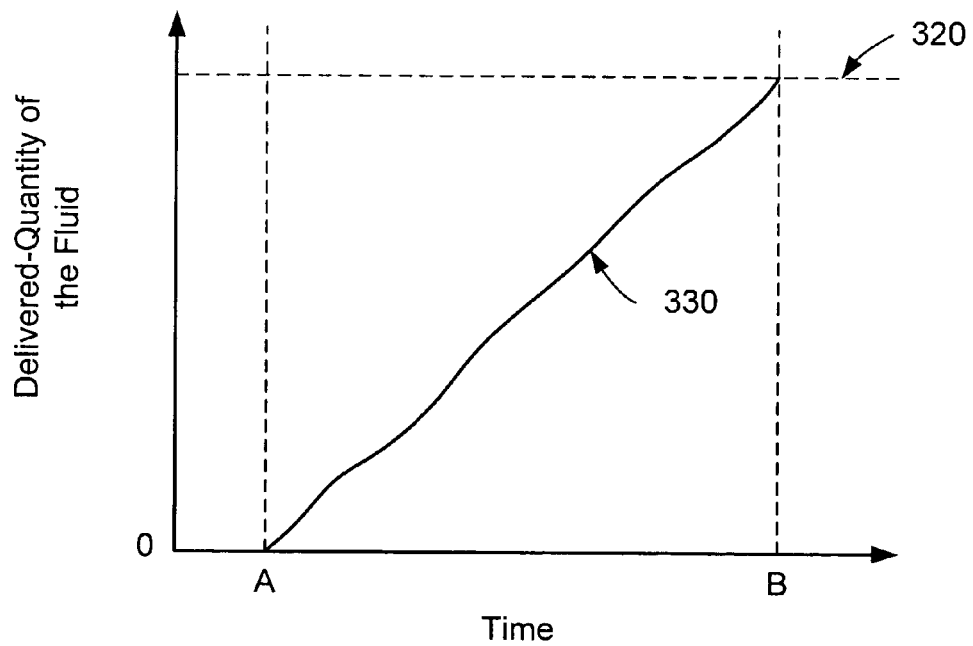
FIG. 3C is a graph of a delivered-quantity of a fluid versus time during the delivery of a specified-quantity of a fluid, according to an embodiment of the invention.

Referring next to FIGS. 3A-C, shown are graphs that depict an exemplary fluid delivery profile 300, a valve position 310 versus time, and a delivered-quantity of a fluid 330 versus time, respectively. As shown in FIGS. 3A-C, at time A, a quantity set point is received by the flow controller indicating a specified-quantity of the fluid to be delivered, and at time B the specified-quantity 320 of fluid is delivered.

As shown in FIG. 3A, the fluid delivery profile 300 in this example is calculated in order to deliver the quantity of the fluid specified by a set point. Specifically, the fluid delivery profile 300 in this example is a set of valve indicators with corresponding times that cause a certain amount of the fluid to be delivered by a flow controller between time A and time B. According to this fluid delivery profile 300, the valve is opened to 50% at time A and is held at that position until the valve is turned off at time B. The time period between time A and time B is referred to as the delivery time window. In some embodiments, the duration of the delivery time window is not a constraint placed on the flow controller, but in many embodiments, the duration of the fluid delivery time window, such as a maximum delivery time window or minimum delivery time window, is a constraint that is reflected in the fluid delivery profile.

In some embodiments, the delivery time window is determined based on, for example, the specified amount of the fluid to be delivered and/or a characteristic of a flow controller. For example, if a large amount of fluid is to be delivered and the flow controller is physically incapable of delivering the fluid within a certain delivery time window, the delivery time window is increased. On the other hand, if the specified-quantity of the fluid is small, based on the flow controller, the fluid delivery time window is shortened.

In many embodiments, the valve indicators and/or times corresponding with at least one of the valve indicators within a fluid delivery profile are modified based on one or more constraints, but in other embodiments, a flow controller is programmed so that a fluid delivery profile is not changed based on changes in constraints.

FIG. 3B shows that at time A when the flow controller receives the quantity set point, the valve displacement 310 is increased immediately to 50% according to the fluid delivery profile 300 shown in FIG. 3A. As shown, the valve displacement 310 is held at 50% until the value of the delivered-quantity of the fluid 330 in FIG. 3C reaches the set point 320, and then the valve is closed and the valve displacement is changed to zero. The graph of the delivered-quantity of the fluid depicted in FIG. 3C corresponds to the change in valve position shown in FIG. 3B, and as shown in FIG. 3B, the delivered-quantity of the fluid 330 is zero at time A when the quantity set point is received and increases until the delivered-quantity of the fluid 330 at time B reaches the set point 320.

FIGS. 3A-C depict an exemplary operation of a flow controller, which includes substantially constant monitoring the flow of the fluid and adjustments to the displacement of the valve to conform with the fluid delivery profile in FIG. 3A. In this example, the fluid delivery profile 300 did not need to be adjusted to deliver the specified-quantity of the fluid. In some embodiments, however, a fluid delivery profile is also adjusted to provide an accurate quantity of fluid.

In many embodiments, a fluid delivery profile is calculated by a flow controller when a quantity set point is received. In one embodiment for example, a flow controller uses equations, based on constraints, such as time delivery window constraints and/or variable valve characteristics, to calculate/determine an optimal fluid delivery profile for delivering a specified-quantity of a fluid. As an example, if a variable valve includes an orifice that cannot accurately deliver a fluid at a particular flow rate, the flow rate is excluded from the calculation of a fluid delivery profile.

In some embodiments, a flow controller is programmed with, for example, a typical fluid delivery profile shape that is adjusted to deliver the particular quantity of a fluid specified by a quantity set point. For example, if a flow controller in these embodiments is programmed to typically deliver a fluid with a tapered opening and tapered closing profile, when a quantity set point is received, the flow controller adjusts the specific values within the opening profile and closing profile to ensure delivery of the particular quantity of fluid specified by the quantity set point while maintaining their generally tapered shapes.

Figure 4:
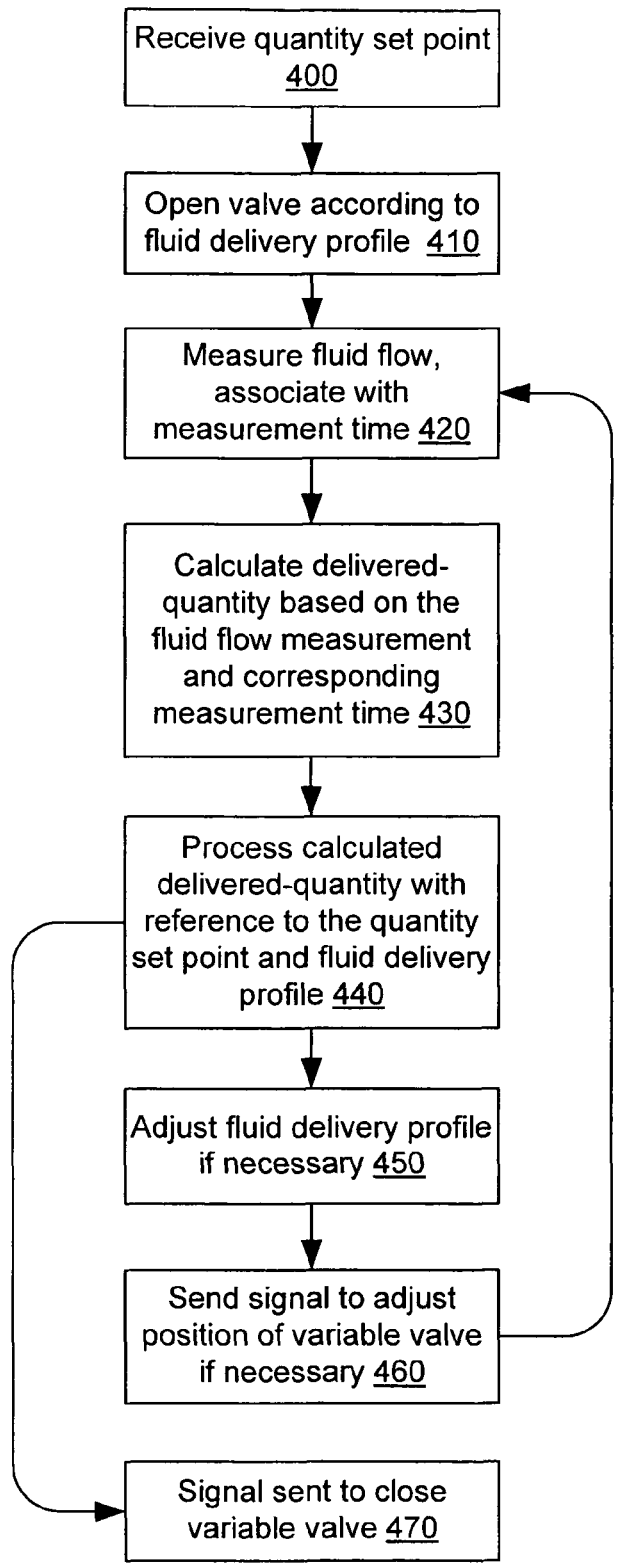
FIG. 4 is a flowchart that illustrates a method for delivering a specified-quantity of a fluid according to a fluid delivery profile, according to an embodiment of the invention.

Referring next to FIG. 4, shown is a flowchart depicting an exemplary process for delivering a specified-quantity of a fluid according to a fluid delivery profile. As shown, a quantity set point that indicates a specified-quantity of a fluid to be delivered by a flow controller (e.g., flow controller 100, 200) is received (Block 400), and in response, a valve (e.g., valve 206) is opened according to a fluid delivery profile to begin delivering the fluid (Block 410).

In many embodiments, the fluid delivery profile is configured, based on the quantity of the fluid that is indicated by the quantity set point, so that, the flow controller opens the valve to a predetermined point. For example, if the quantity set point indicates that a small quantity of fluid is to be delivered relative to the delivery capacity and response time of the valve, the fluid delivery profile is configured so that the valve opens to a fraction of its full delivery capacity. In some embodiments, the variable valve is opened to an accurately characterized position.

After the fluid begins to flow through the valve, a feedback loop is used to monitor the delivered-quantity of the fluid and adjust the variable valve and/or fluid delivery profile until the specified-quantity is completely delivered. As shown in FIG. 4, for example, once the valve is opened (Block 410), the fluid flow is measured and associated with a corresponding measurement time that indicates the time that the flow was measured (Block 420). The delivered-quantity of the fluid is then calculated based on the measured flow and corresponding measurement time (Block 430). In this embodiment, only the value for the delivered-quantity of the fluid is stored and this value is updated when a new data point is measured (Block 420). In other embodiments, each flow measurement and corresponding measurement time are stored and the delivered-quantity of the fluid is calculated based on the stored set of fluid flow and time measurements.

As depicted in FIG. 4, the calculated delivered-quantity of the fluid is then processed with reference to the quantity set point and the fluid delivery profile (Block 440). If the quantity set point has not yet been reached, and if necessary, the fluid delivery profile is adjusted (Block 450) and/or the position of the variable valve is adjusted (Block 460). For example, if it is projected, based on the calculated delivered-quantity of the fluid and based on the fluid delivery profile, that the specified-quantity of fluid will not be delivered within a specified time delivery window, the fluid delivery profile is adjusted to accelerate delivery of the fluid, and a signal is sent to adjust the position of the variable valve based on the new fluid delivery profile. In some embodiments, the fluid delivery profile is adjusted through deceleration of the fluid delivery profile.

In some embodiments, the decision to adjust the fluid delivery profile is based on a threshold value for deviations away from a projected delivered-quantity of the fluid. For example, a flow controller is programmed to adjust a fluid delivery profile if the projected final delivered-quantity will be more than +/−3% from the specified-quantity of fluid to be delivered as indicated by a quantity set point. The flow controller in these embodiments uses the current calculated delivered-quantity of the fluid and the fluid delivery profile to project the final delivered-quantity of fluid, and if only 95%, for example, of the specified-quantity of fluid will be delivered, the flow controller adjusts the fluid delivery profile. In this scenario, the fluid delivery profile is adjusted to, for example, more aggressively deliver fluid by increasing the flow indicators in the fluid delivery profile. In other embodiments, the fluid delivery profile is not adjusted until, for example, more than two measured and/or calculated values exceed a threshold value.

In several embodiments, a valve adjustment (Block 460) is made even if the fluid delivery profile is not adjusted at 450. For example, if the measured fluid flow has deviated from the fluid delivery profile, but not enough to trigger a fluid delivery profile adjustment (Block 450), a signal is sent to the variable valve to adjust its position (Block 460) to conform with the fluid delivery profile.

After any necessary adjustments have been made to the fluid delivery profile (Block 450) and/or the variable valve (Block 460), the flow controller continues to measure fluid flow and associate the measurements with a measurement time (Block 420). Also, if it is determined that an adjustment to the fluid delivery profile is not necessary (Block 450) and that an adjustment to the variable valve position is not necessary (Block 460), the flow controller continues to measure fluid flow and associate the measurements with measurement times (Block 420).

In the exemplary embodiment, Blocks 420-460 represent a feed back loop which is repeated until it is determined that the quantity set point has been reached (Block 440), and if it has been reached, then a signal is sent to close the variable valve (Block 470). As an example, a close signal is sent to the variable valve if the calculated delivered-quantity of the fluid is greater than or equal to the quantity set point. In many embodiments, a signal is sent to close the variable valve before the quantity set point has been reached. For example, if the response time of the variable valve is slow, a signal to close the variable valve is sent in anticipation that the final delivered-quantity will meet the quantity set point when the variable valve responds and actually closes.

The cycle time of the feedback loop, which in this exemplary embodiment is the time required to execute steps depicted in Blocks 420 through 460, is adjusted depending on one or more variables including, among others, the response time of the variable valve, the specified-quantity of the fluid, the time window for delivering the fluid and the requirements of the system receiving the specified-quantity of the fluid. For example, if the response time of the variable valve is very long compared with the time it takes to execute the feedback loop, the cycle time of the feedback loop is increased so that the variable valve is allowed adequate time to respond and fluid flow measurements will not be needlessly processed. A feedback loop that is not properly tuned in this scenario could result in a system instability because the feedback loop may send over-corrective signals based on the slow response of the valve. In some embodiments, if a specified-quantity of a fluid is relatively small or a delivery time window is short, the cycle time of the feedback loop is decreased to ensure that measurements are processed and valve adjustments are made fast enough to accurately deliver the specified-quantity of the fluid.

In some embodiments, the order of the steps in the flowchart and/or feedback loop shown in FIG. 4 is adjusted. For example, in many embodiments a signal is sent to adjust the position of the variable valve before the fluid delivery profile is adjusted. In other embodiments, a signal is sent to adjust the variable valve based on the measurement of the fluid flow before the delivered-quantity of the fluid is calculated, and in yet other embodiments, the rates of measurement, calculation, and adjustment are different. For example, fluid flow values may be measured at a faster rate than adjustments are made to the fluid delivery profile and/or the variable valve position. In addition, the rate of adjustment of the fluid delivery profile and the rate of adjustment of the variable valve position may be different and can even be executed in parallel feedback loops.

Figure 5A:
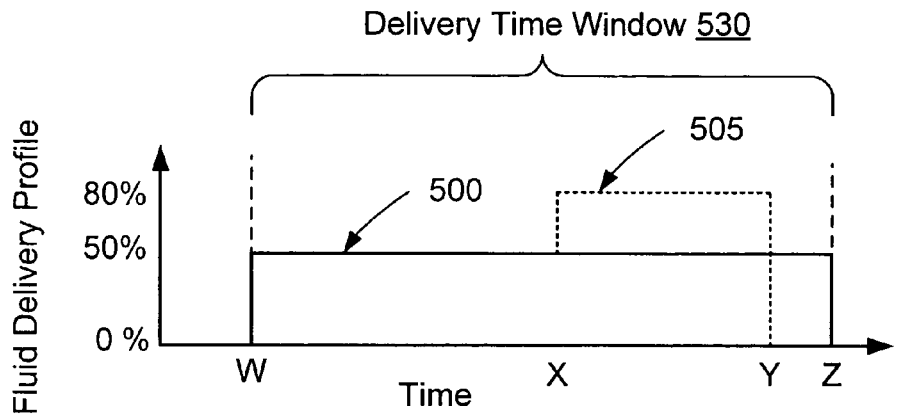
FIG. 5A is a graph that shows a fluid delivery profile that is changed by a flow controller, according to an embodiment of the invention.
Figure 5B:
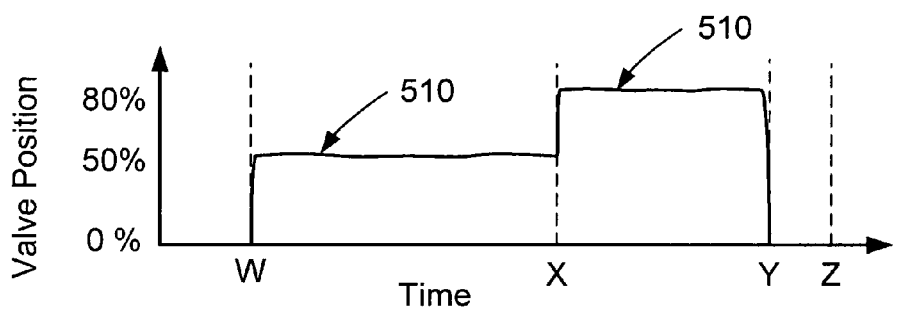
FIG. 5B is a graph of a valve displacement versus time during the delivery of a specified-quantity of a fluid, according to an embodiment of the invention.
Figure 5C:
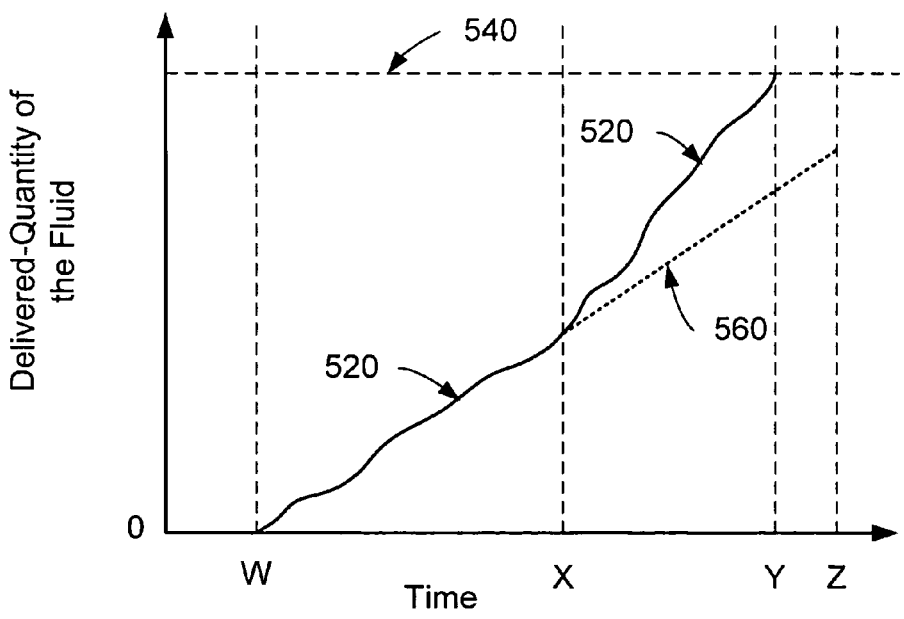
FIG. 5C is a graph of a delivered-quantity of a fluid versus time during the delivery of a specified-quantity of a fluid, according to an embodiment of the invention.

Referring next to FIGS. 5A-C, shown are graphs depicting a fluid delivery profile 500, a valve displacement versus time 510, and a delivered-quantity of the fluid versus time 520, respectively, corresponding to a flow controller (e.g., the flow controller 100) responding to a quantity set point and a delivery time window constraint. As shown in FIG. 5A a fluid delivery profile in this example is changed from an initial fluid delivery profile 500 to a modified fluid delivery profile 505 based on calculations by a flow controller and based on a delivery time window constraint 530. At time W, as shown in FIGS. 5A-C, a quantity set point is received by the flow controller indicating the quantity of fluid to be delivered. Based on the start time at W and the duration of the delivery time window, the flow controller is required to deliver the specified-quantity 540 of the fluid before time Z.

As shown in FIG. 5B, at time W, when the flow controller receives the quantity set point, the valve displacement 510 in this example is increased immediately to 50% according to the initial fluid delivery profile 500 shown in FIG. 5A, which also indicates that the valve position is to be maintained at 50% until the valve is closed at time Y. As shown in FIG. 5C, the delivered-quantity of the fluid 520 increases gradually from zero at time W when valve is opened until the delivered quantity 520 reaches the specified quantity 540. In this example, the flow controller monitors and processes fluid flow measurements using an algorithm (e.g., an algorithm described with reference to FIG. 4) to deliver the specified quantity 540 of fluid.

As shown in FIG. 5C, the flow controller in this example calculates, at time X, a projected delivered-quantity of the fluid 560 based on the current delivered-quantity of the fluid 520 and based on the initial fluid delivery profile 500 shown in FIG. 5A. In this example, the projected delivered-quantity of the fluid 560 shows that that the specified-quantity 540 will not be reached using a valve displacement of 50% before time Z, and as a result of the calculation, at time X, the fluid delivery profile in FIG. 5A is changed from the initial fluid delivery profile 500 to the modified fluid delivery profile 505. As shown in FIG. 5B, in conformity with the fluid delivery profile change in FIG. 5A, the valve displacement 510 is changed to 80%. This change in displacement causes an acceleration in the delivery of the fluid and an inflection in curve 520 at time X as shown in FIG. 5C.

As depicted in FIG. 5B, in accordance with the modified fluid delivery profile 505 in FIG. 5A, at time Y the valve is closed and the valve displacement is changed to zero, which corresponds to the specified quantity 540 being reached.

Figure 6A:
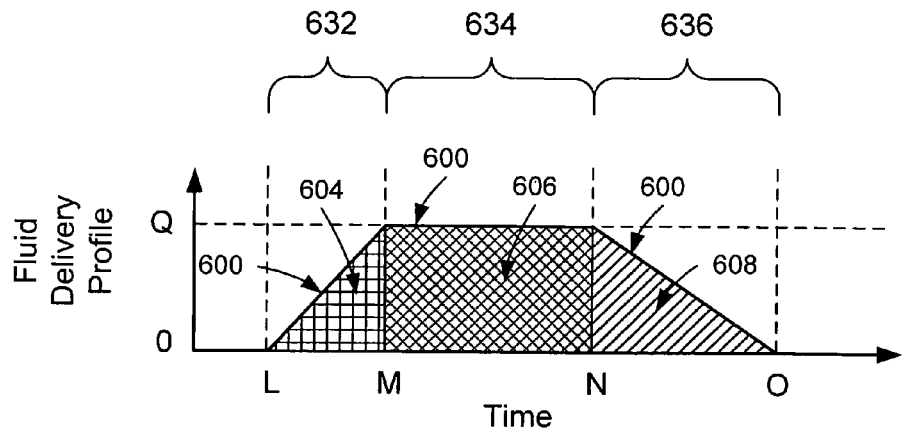
FIG. 6A is a graph of a fluid delivery profile with several portions, according to an embodiment of the invention.

Referring next to FIG. 6A, shown is an exemplary fluid delivery profile 600 with three portions, an opening portion 632, a middle portion 634 and a closing portion 636, which are also referred to herein as the opening profile 632, middle profile 634 and the closing profile 636. In this example, the fluid delivery profile 600 is a profile calculated by a flow controller in response to a quantity set point indicating a specified-quantity of fluid to be delivered and in response to constraints for delivering the fluid. In response to the quantity set point, the flow controller sends signals to adjust the variable valve to deliver the flow rates at the corresponding times in conformity with the fluid delivery profile 600.

As depicted in FIG. 6, the fluid delivery profile 600 in this example is composed of a set of flow rates with corresponding times. The area under the fluid delivery profile 600 corresponds to the total amount of fluid to be delivered by the flow controller using the fluid delivery profile 600, and as shown, areas 604, 606, and 608 are the amount of fluid to be delivered during the opening profile 632, middle profile 634, and closing profile 636, respectively. As shown, the flow rate slowly increases in accordance with the opening profile 632, and once the middle profile 634 is reached, the flow rate is held substantially constant until the flow rate is slowly decreased according to the closing profile 636.

In this example, the fluid delivery profile 600 is calculated (e.g., by a flow controller) to deliver approximately 15% of the fluid during the opening profile 632, 65% of the fluid, at a flow rate Q, during the middle profile 634, and the balance of the fluid during the closing profile 636. More specifically, the slope of the opening portion 632 of the fluid delivery profile 600 is calculated so that the flow controller delivers 15% of the specified-quantity of the fluid and reaches the flow rate Q. The duration of the middle profile 634 is calculated so that 65% of the fluid (a delivered-quantity of 80%) is delivered, and the slope of the closing profile 636 is calculated so that the flow controller delivers the final 20% of the specified-quantity of the fluid.

Although not required, in some embodiments a flow controller (e.g., the flow controller 100) starts to deliver fluid according to the opening profile 632 after the flow controller receives a quantity set point and completes the calculation of the fluid delivery profile 600. In some variations of these embodiments, the flow controller is programmed (e.g., through a control signal) to begin delivering the fluid after a certain period of time has elapsed after completing the calculation of the fluid delivery profile 600. Although the entire fluid delivery profile 600 is calculated in these embodiments before the flow controller starts to deliver the specified-quantity of the fluid, in many implementations, portions of the fluid delivery profile 600 are calculated and/or adjusted based on the monitoring of the flow of the fluid. In several embodiments, portions of the fluid delivery profile are not only adjusted in real-time, but are also initially calculated in real-time as fluid is delivered. For example, the flow controller calculates only the opening portion of the fluid delivery profile 632, and later calculates the middle 634 and closing 636 profiles just before using those profiles.

Figure 6B:
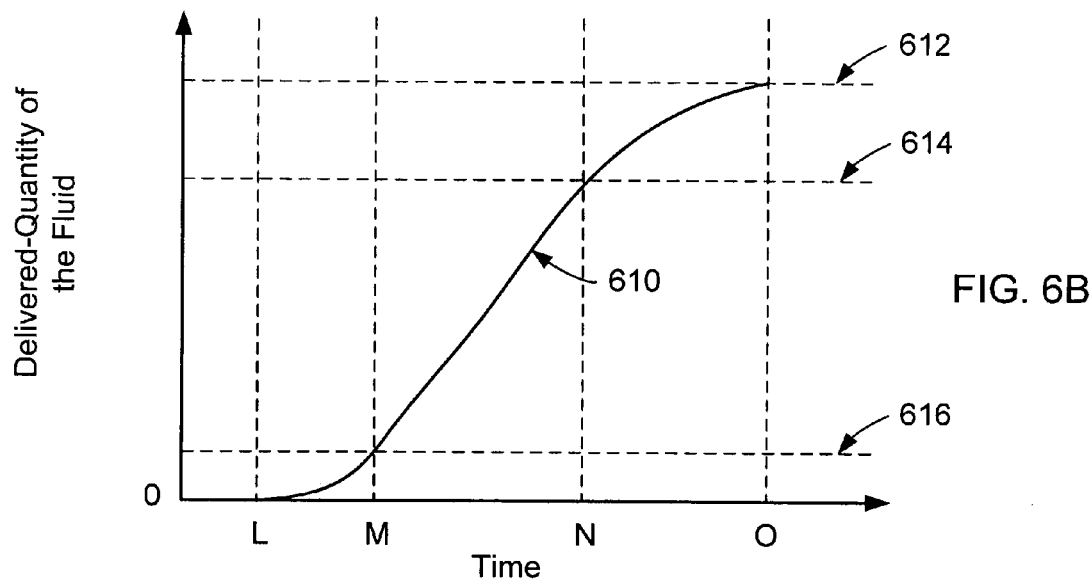
FIG. 6B is a graph of a delivered-quantity of a fluid versus time during the delivery of a specified-quantity of a fluid, according to an embodiment of the invention.
Figure 6C:
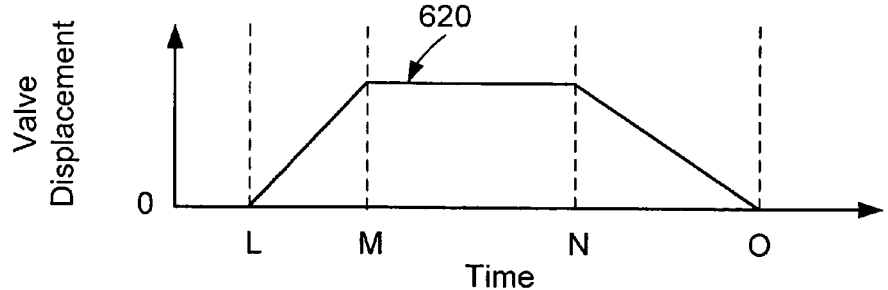
FIG. 6C is a graph of a valve displacement versus time during the delivery of a specified-quantity of a fluid, according to an embodiment of the invention.

Referring to FIGS. 6B and 6C, shown are a delivered-quantity of the fluid 610 versus time and a valve displacement 620 versus time, respectively, that corresponds to the fluid delivery profile 600 shown in FIG. 6A. As depicted in FIGS. 6A-C, a flow controller operating in accordance with the exemplary profile 600 starts to deliver the fluid at time L according to the opening profile 632 by adjusting the valve displacement 620. When the delivered-quantity of the fluid 610 is approximately 15% (shown at 616) in FIG. 6B, the flow controller starts to deliver fluid at time M according to the middle profile 634. At time N when the delivered-quantity of the fluid 610 reaches approximately 80% (shown at 614) in FIG. 6B, the flow controller starts to deliver fluid by adjusting the valve displacement 620 according to the closing profile 636 of the fluid delivery profile 600. As shown in FIGS. B and C, when the delivered-quantity of the fluid 610 reaches the quantity set point 612 at time O, the valve displacement is zero in conformity with the fluid delivery profile 600.

Although the exemplary fluid delivery profile 600 is described with reference to three constituent profiles, it should be recognized that delivery profiles in accordance with other embodiments include other quantities and/or shapes of distinguishable sub-profiles, which may be separately determined by, for example, different constraints.

Figure 7:
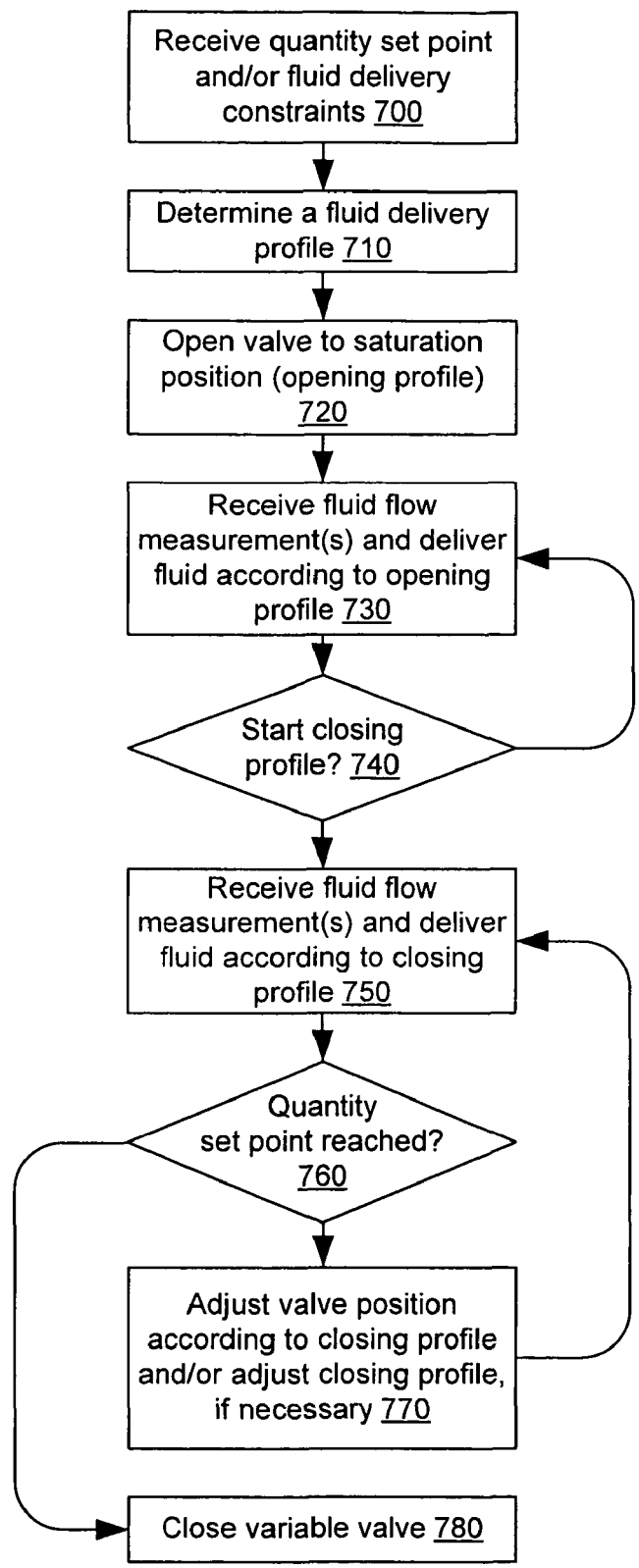
FIG. 7 is a flowchart that illustrates a method for delivering a specified-quantity of a fluid according to a fluid delivery profile with two portions, according to an embodiment of the invention.

Referring next to FIG. 7, shown is a flowchart depicting an exemplary method that is implemented by a flow controller (e.g., flow controller 100) for the delivery of a specified-quantity of a fluid according to a fluid delivery profile with two portions: an opening profile and a closing profile. In this embodiment, the flow controller opens a variable valve to a saturation position (i.e., a position where a flow sensor is saturated) according to the opening profile and delivers fluid until a specified percentage of the quantity of fluid indicated by a quantity set point is delivered. When the specified percentage has been delivered, the flow controller delivers fluid according to the closing profile until the total specified-quantity of the fluid is delivered. Although other percentages of fluid may certainly be specified, it is assumed for this example that the flow controller starts to close the variable valve according to the closing profile when 50% of the quantity set point is delivered.

As shown, when a quantity set point indicator and/or fluid delivery constraints are received (Block 700), a fluid delivery profile is calculated to include an opening profile and a closing profile (block 710). As depicted, in this embodiment a variable valve is opened to its saturation position (Block 720), and then fluid flow measurement(s) are received (Block 730).

In this embodiment, a delivered-quantity of the fluid is calculated based on the fluid flow measurement(s) to determine whether the flow controller should switch to the closing profile (Block 740). As shown, when the calculated delivered-quantity is less than 50% of the specified-quantity of the fluid as indicated by the quantity set point, fluid flow measurement(s) continue to be received and fluid is delivered according to the opening profile (Block 730). As shown, when the delivered-quantity exceeds 50%, fluid measurements are received and fluid is delivered according to the closing profile (Block 750).

As depicted in FIG. 7, in this embodiment, based on the fluid measurement(s), the flow controller determines whether the quantity set point has been reached (Block 760), and when the quantity set point has been reached, the flow controller closes the variable valve (Block 780). In many implementations, the flow controller initiates the closure of the variable in advance of the quantity set point being reached so that by the time the valve actually closes, the specified quantity is delivered.

If the quantity set point has not been reached, and if necessary, the flow controller makes adjustments to the variable valve position or closing profile, based on the fluid measurement(s) (Block 770) and the flow controller repeats Blocks 750, 760 and 770 until the quantity set point is reached.

Figure 8A:
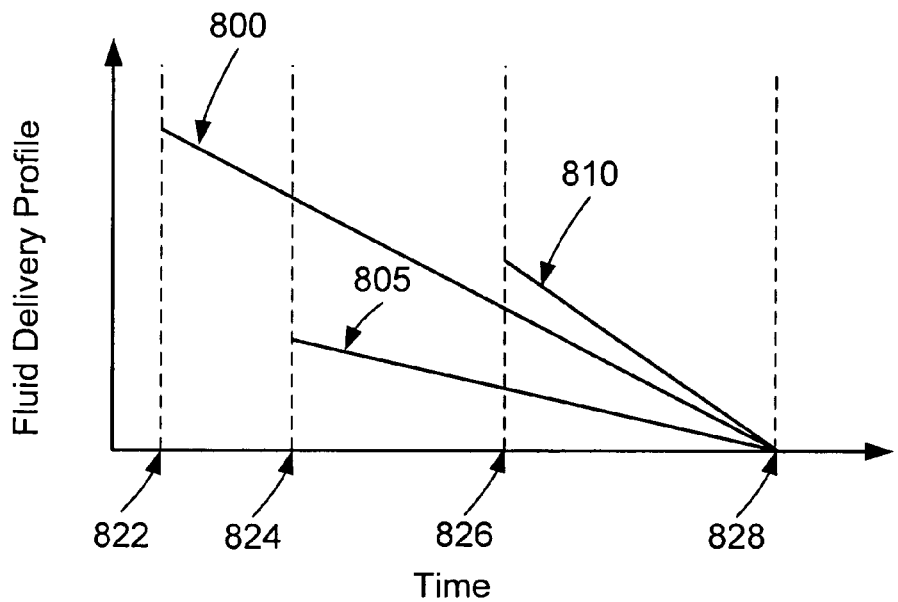
FIG. 8A is a graph of a closing portion of a fluid delivery profile that is changed over time, according to an embodiment of the invention.
Figure 8B:
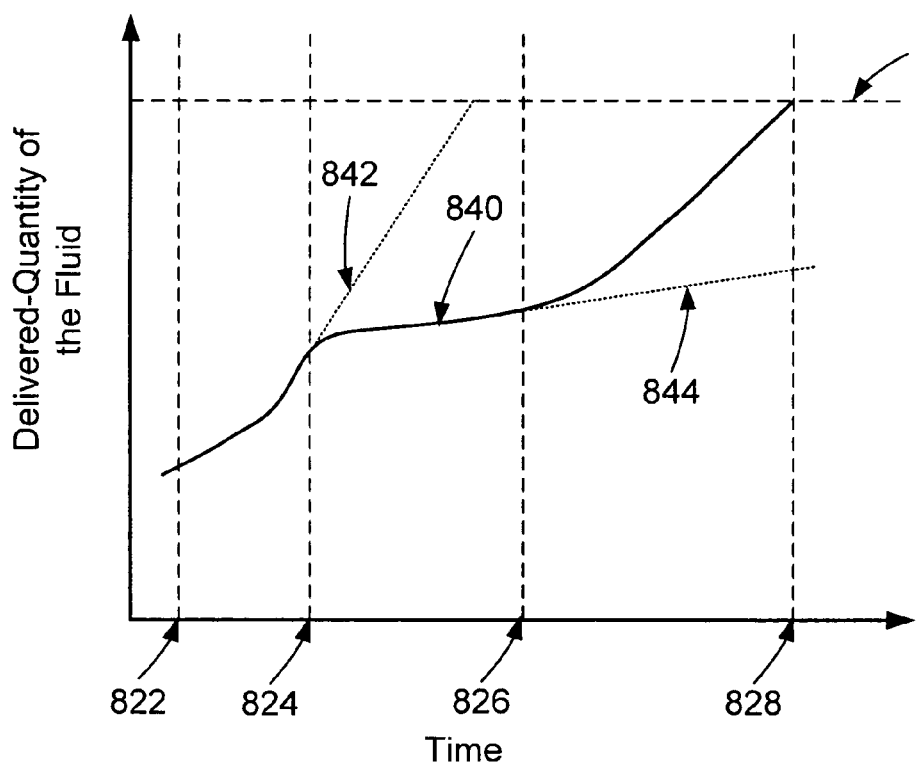
FIG. 8B is a graph of a delivered-quantity of a fluid versus time during the delivery of a specified-quantity of a fluid according to the fluid delivery profile in FIG. 8A, according to an embodiment of the invention.

Referring next to FIGS. 8A and 8B, shown are a graph depicting a closing portion of an exemplary fluid delivery profile (also referred to herein as a closing profile) 800, being adjusted over time in response to deviations in a delivered-quantity of a fluid, and a graph depicting the delivered-quantity of the fluid 840, respectively. In this example, the flow controller has been programmed to complete the delivery of a quantity of fluid at a completion time 828, and as shown, the closing profile in this example is modified two times from a first, initial closing profile 800 to a second closing profile 805 (at a second time 824) and then again to a third closing profile 810 (at a third time 826) to deliver a specified quantity 812 of the fluid.

As depicted in FIG. 8B, the delivered-quantity of the fluid 840 in this example increases rapidly relative to the rate of increase at, for example, an initial time 822. Such variations in the fluid delivery rate may be due to various factors, including for example, a change in the pressure of the flow of the fluid. As depicted in FIG. 8B, a projection 842 of the final delivered-quantity of the fluid as calculated at the second time 824 shows that the specified quantity 812 would be reached well before the completion time 828 in violation of the time constraint. As a consequence, in this embodiment the initial fluid delivery profile 800 was modified at the second time 824, in response to the projection 842, to the second closing profile 805, which corresponds to a lower rate of fluid delivery.

As shown in FIG. 8B, in response to the lower rate of delivery induced by the second closing profile 805, the increase in the delivered-quantity of the fluid between the second time 824 and the third time 826 was relatively flat. Another projection 844 of the final delivered-quantity calculated at the third time 826 in FIG. 8B shows that the quantity set point would be reached at an unacceptable time well after the desired completion time 828. As a consequence, as shown in FIG. 8A, a change was made from the second fluid delivery profile 805, which effected a relatively low rate of fluid delivery, to the third closing profile 810 to effect a higher rate of fluid delivery so as to deliver the specified quantity 812 of the fluid at the desired completion time 828.

Although modifications to a closing profile are made in connection with many embodiments (e.g., embodiments described with reference to FIGS. 8A and 8B), in other embodiments, other portions of a fluid delivery profile (e.g., an opening profile and/or middle profile) are adjusted. In addition, in some embodiments a single indicator (e.g., valve setting indicator) and corresponding time from within a fluid delivery profile is modified rather than an entire fluid delivery profile or entire portion of a fluid delivery profile. In yet other embodiments, modification of a fluid delivery profile is triggered by constraints that are received at any point during the delivery of a fluid.

In conclusion, the present invention provides, among other things, a system and method for controlling flow of a fluid to deliver a specified-quantity of the fluid. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. An apparatus for delivering a molar quantity of gas, comprising:
   a memory configured to store a gas-specific-delivery-profile prior to initiating gas delivery, the gas-specific-delivery-profile cotemporaneously including a plurality of valve indicators that define (i) a plurality of valve positions between an open position and a closed position for a variable valve over a delivery time window and (ii) a specific molar quantity of the gas; and
   a processor configured to receive an indication of a molar flow rate of the gas and a request for the specified-molar-quantity of the gas, and in response to the request for the specified-molar-quantity and the indication of the molar flow rate, the processor is configured to control the variable valve in accordance with the gas-specific-delivery-profile and the molar flow rate so as to deliver the specified-molar-quantity of the gas during the delivery time window.

2. The apparatus of claim 1, including a variable valve configured to modulate the molar flow rate of the gas.

3. The apparatus of claim 1, including:
   a flow sensor configured to provide the indication of the molar flow rate to the processor.

4. The apparatus of claim 1, wherein the processor is configured to calculate, using the indication of the molar flow rate, a delivered-molar-quantity of the gas, and wherein the processor is configured to modify the gas-specific-delivery-profile in response to the delivered-molar-quantity of the gas.

5. The apparatus of claim 1, wherein the processor is configured to modify the gas-specific-delivery-profile based on at least one of the indication of the molar flow rate, the specified-molar-quantity of the gas, or the delivery time window.

6. The apparatus of claim 1, further comprising at least one of a temperature sensor configured to send a temperature indicator and a pressure transducer configured to send a pressure indicator, the processor using at least one of the temperature indicator or the pressure indicator to control the variable valve.

7. The apparatus of claim 1, further comprising at least one of a temperature sensor configured to send a temperature indicator and a pressure transducer configured to send a pressure indicator, the processor using at least one of the temperature indicator or the pressure indicator to modify the gas-specific-delivery-profile.

8. An apparatus for delivering a specified-molar-quantity of gas, comprising:
   a memory including an initial gas-specific-delivery-profile, the initial gas-specific-delivery-profile including a delivery time window and a plurality of set points between a closed set point and an open set point, each set point from the plurality of set points being associated with a specified instant in time within the delivery time window, the plurality of set points being stored cotemporaneously in the memory prior to gas delivery;
   a variable valve configured to be set to a plurality of positions between an open position and a closed position;
   a processor adapted to control the position of the variable valve according to the initial gas-specific-delivery-profile, and in response to a projected delivered-quantity of the gas being less than a specified-molar-quantity of a gas at the end of the delivery time window, modifying the initial gas delivery profile while gas is being delivered so as to deliver the specified-molar-quantity of the gas at the end of the delivery time window.

9. The apparatus of claim 8, wherein the initial gas delivery profile includes a tapered opening and a tapered closing profile.

10. The apparatus of claim 9, wherein the closing profile is modified in response to a projected delivered-molar-quantity of the gas being less than the specified-molar-quantity of a gas at the end of the delivery time window.

* * * * *